US010173783B2

(12) United States Patent
Le Cadet et al.

(10) Patent No.: US 10,173,783 B2
(45) Date of Patent: Jan. 8, 2019

(54) ROTORCRAFT WITH COWLING ABLE TO ROTATE AND TRANSLATE RELATIVE TO THE FUSELAGE

(71) Applicant: AIRBUS HELICOPTERS DEUTSCHLAND GmbH, Donauworth (DE)

(72) Inventors: Yann Le Cadet, Thierhaupten (DE); Christophe Leteurtre, Velaux (FR)

(73) Assignees: Airbus Helicopters, Marignane (FR); Airbus Helicopters Deutschland GmbH, Donauworth (DE)

( * ) Notice: Subject to any disclaimer, the term of this patent is extended or adjusted under 35 U.S.C. 154(b) by 232 days.

(21) Appl. No.: 15/244,379

(22) Filed: Aug. 23, 2016

(65) Prior Publication Data

US 2018/0057183 A1    Mar. 1, 2018

(51) Int. Cl.

| B64D 29/06 | (2006.01) |
|---|---|
| B64D 29/04 | (2006.01) |
| B64D 29/08 | (2006.01) |
| B64C 27/06 | (2006.01) |
| B64C 1/14 | (2006.01) |
| B64C 7/00 | (2006.01) |

(52) U.S. Cl.
CPC ........... *B64D 29/06* (2013.01); *B64C 1/14* (2013.01); *B64C 1/1446* (2013.01); *B64C 7/00* (2013.01); *B64C 27/06* (2013.01); *B64D 29/04* (2013.01); *B64D 29/08* (2013.01)

(58) Field of Classification Search
CPC ........ B64D 29/04; B64D 29/06; B64D 29/08; B64F 5/40; B60J 1/1853; B60J 5/0473
See application file for complete search history.

(56) References Cited

U.S. PATENT DOCUMENTS

| 2,332,158 | A | | 10/1943 | Magill et al. | |
|---|---|---|---|---|---|
| 2,494,347 | A | * | 1/1950 | Matthews | B64D 29/08 16/260 |
| 3,935,674 | A | | 2/1976 | Williams et al. | |
| 6,189,832 | B1 | * | 2/2001 | Jackson | B64C 7/02 244/129.4 |
| 6,220,546 | B1 | * | 4/2001 | Klamka | B64D 29/00 244/129.4 |
| 6,227,485 | B1 | * | 5/2001 | Porte | B64D 29/08 244/53 B |
| 6,334,730 | B1 | * | 1/2002 | Porte | B64D 29/08 244/129.5 |
| 2005/0056726 | A1 | * | 3/2005 | Mayes | B64D 29/06 244/54 |
| 2007/0267539 | A1 | * | 11/2007 | Bulin | B64D 29/06 244/53 R |

(Continued)

OTHER PUBLICATIONS

European Search Report for European Application No. EP 15001153. 4, Completed by the European Patent Office Dated Jun. 30, 2016, 8 Pages.

*Primary Examiner* — Timothy D Collins
*Assistant Examiner* — Tye William Abell
(74) *Attorney, Agent, or Firm* — Brooks Kushman P.C.

(57) ABSTRACT

A rotorcraft comprising a cowling for closing an opening in the fuselage, the cowling being linked to the fuselage by means of a fastening system having a supporting means pivotally attached to the interior of the fuselage and a translation means coupled to the supporting means to respectively enable movements of rotation and translation of the cowling.

18 Claims, 4 Drawing Sheets

(56) References Cited

U.S. PATENT DOCUMENTS

| | | | | |
|---|---|---|---|---|
| 2011/0318173 A1* | 12/2011 | Ramlaoui | ............ | B64D 29/06 |
| | | | | 415/182.1 |
| 2013/0220435 A1* | 8/2013 | James | .................... | B64D 29/08 |
| | | | | 137/15.1 |
| 2015/0369083 A1* | 12/2015 | Mercier | ................. | B64D 29/06 |
| | | | | 415/214.1 |
| 2016/0101871 A1* | 4/2016 | Boileau | ................. | B64D 29/06 |
| | | | | 415/182.1 |
| 2016/0145918 A1* | 5/2016 | Liang | ................... | B64C 1/1446 |
| | | | | 292/99 |
| 2016/0201371 A1* | 7/2016 | Harding | .................... | B64C 1/14 |
| | | | | 244/129.4 |
| 2016/0229546 A1* | 8/2016 | Chavignier | ............ | B64D 29/06 |
| 2016/0264249 A1* | 9/2016 | Lozano | ................. | B64D 29/08 |
| 2016/0333791 A1* | 11/2016 | Snyder | .................... | F01D 25/28 |
| 2017/0015431 A1* | 1/2017 | Antonacci | ............. | B64D 29/08 |
| 2017/0174353 A1* | 6/2017 | Joret | ...................... | B64D 29/06 |
| 2017/0253341 A1* | 9/2017 | Shortt, Jr. | .............. | B64D 29/00 |

\* cited by examiner

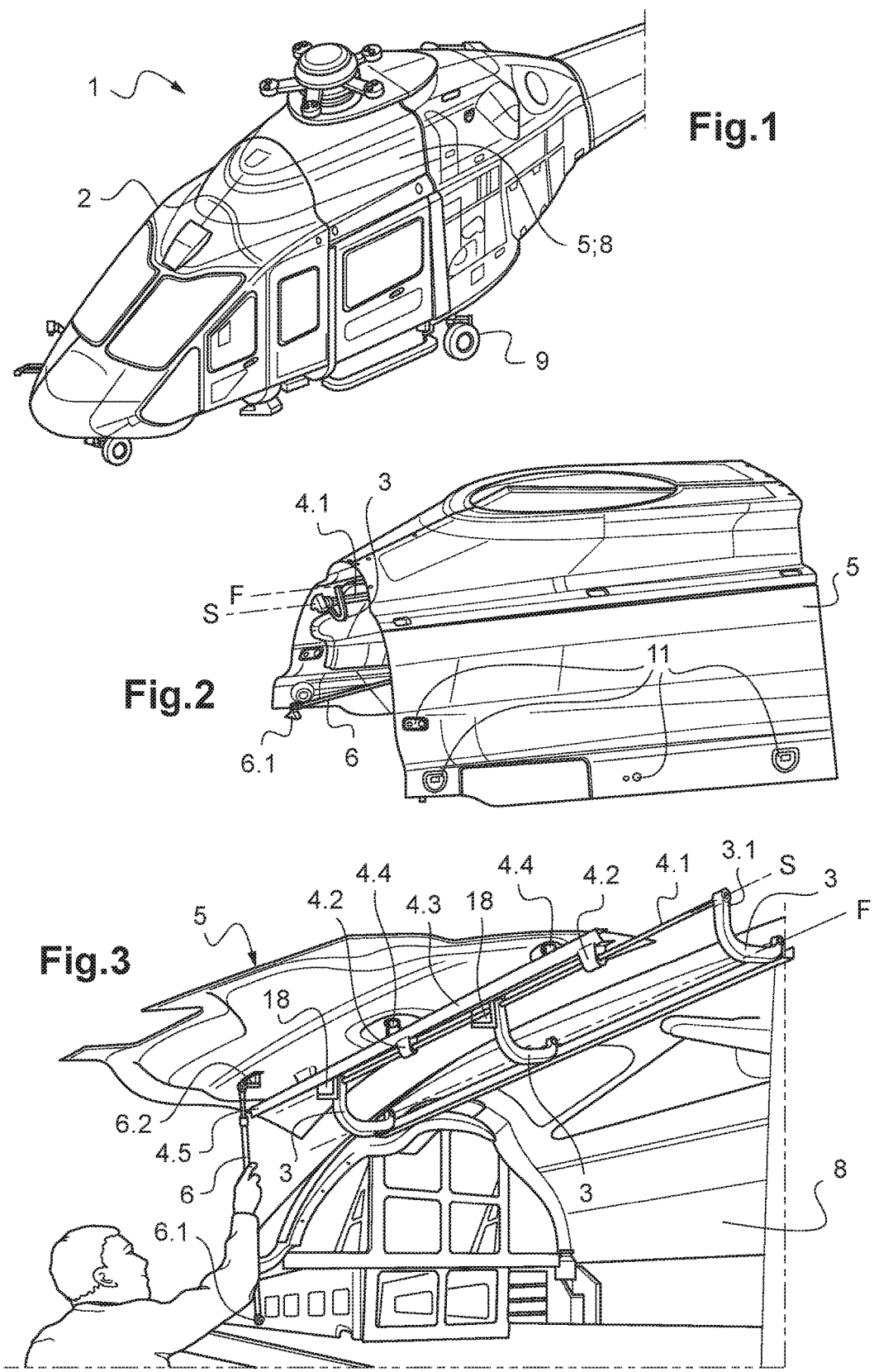

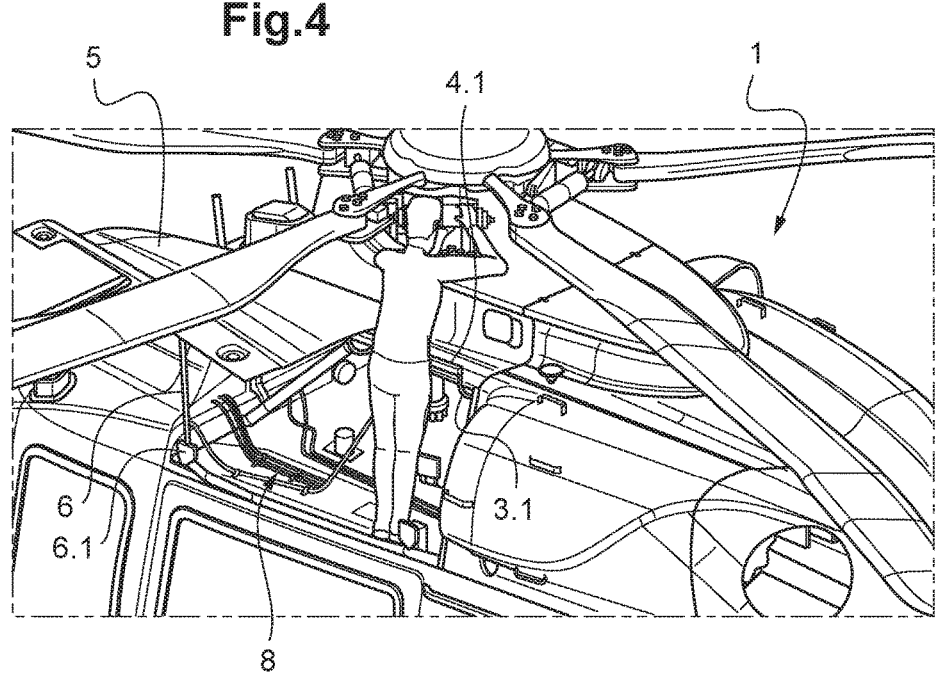
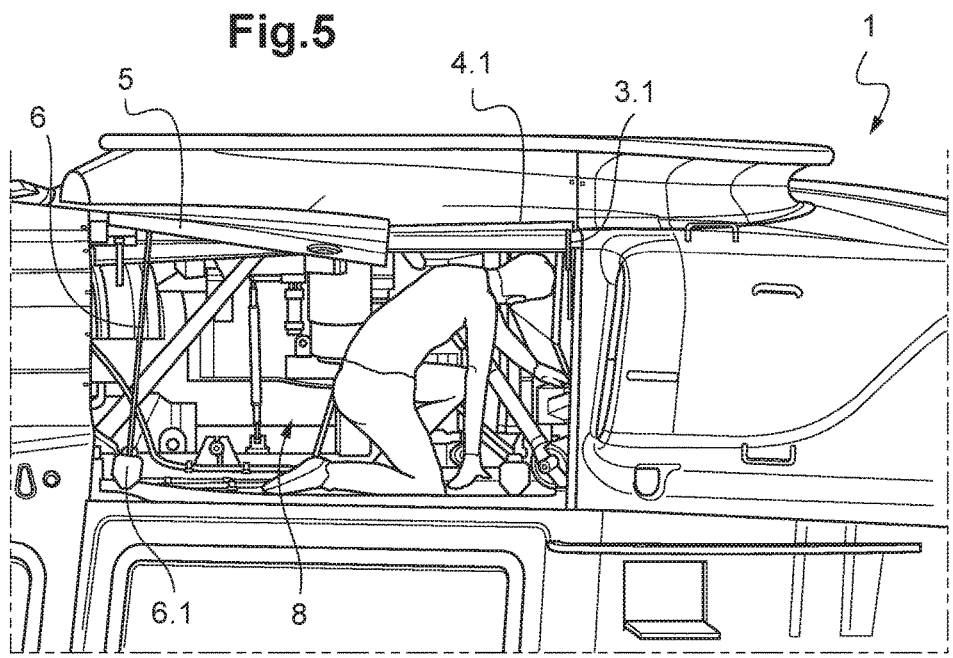

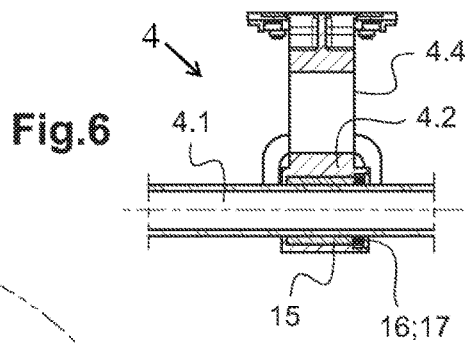
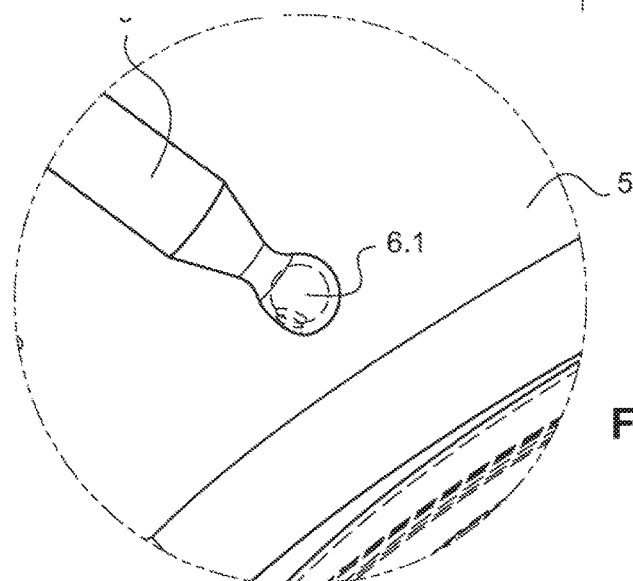
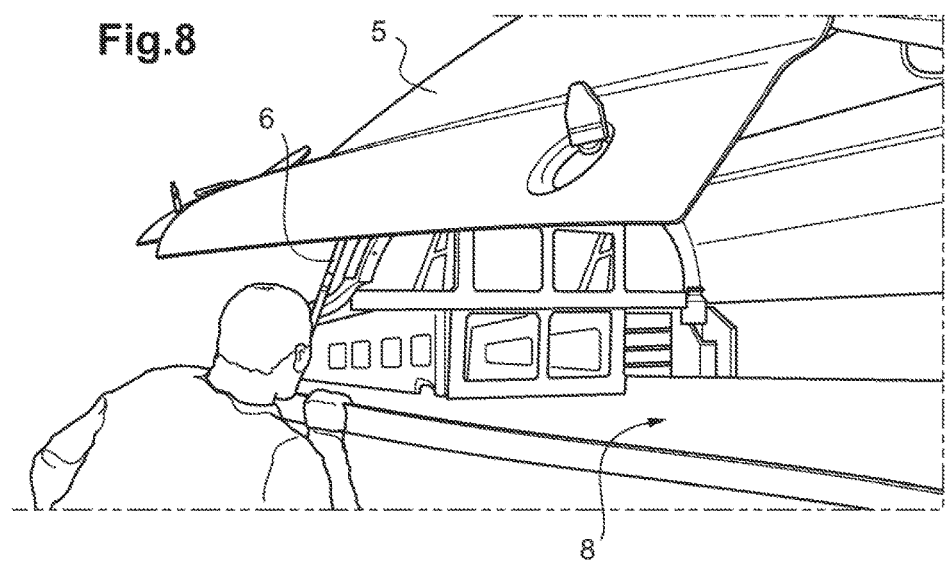

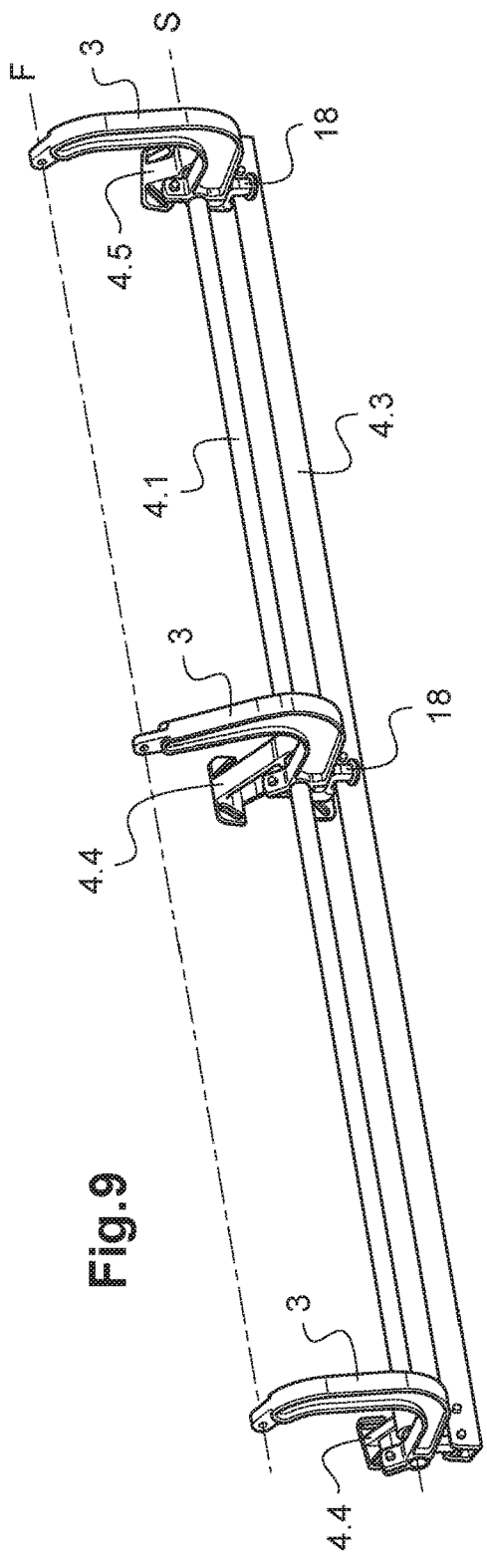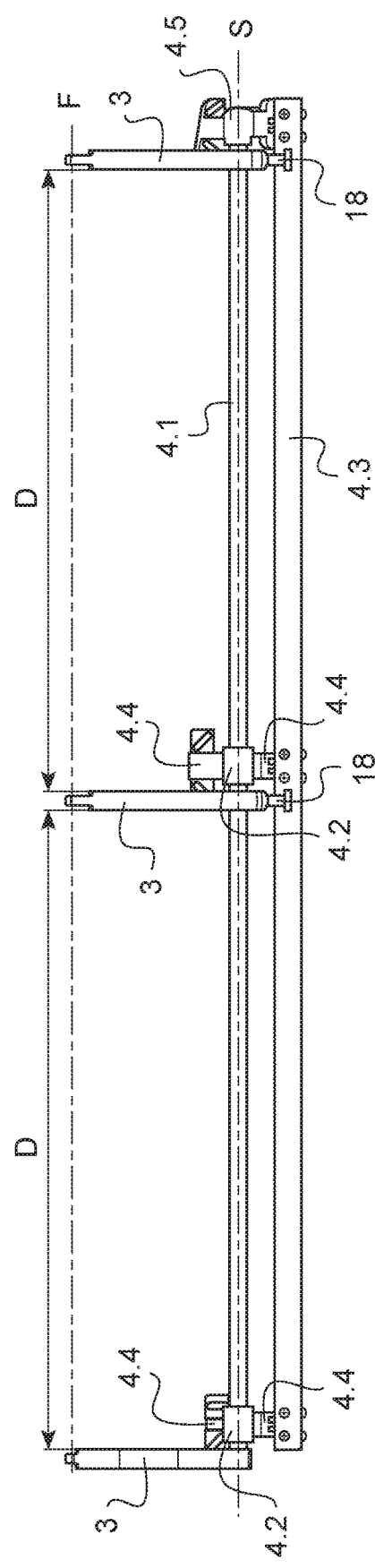

ROTORCRAFT WITH COWLING ABLE TO ROTATE AND TRANSLATE RELATIVE TO THE FUSELAGE

BACKGROUND OF THE INVENTION

(1) Field of the Invention

The present invention belongs to the field of cowlings for protecting the interior of a rotorcraft and of the systems for moving the cowlings from a closed position to an open position.

(2) Description of Related Art

Several types of mechanisms for opening a cowling are known in the prior art.

A first type of arrangement, intended for swinging cowlings, comprises two or more hinges that define an axis around which the cowling opens. Although the arrangement is simple and adaptable to several geometries, the cowling may protrude far from the fuselage, which requires a wide area to open the door; besides, the cowling may block the access to the upper part of the fuselage and, consequently, to the rotor.

In a further arrangement, the cowling is fixed to the fuselage by means of screws or other similar means. Therefore, the fixation must be removed to dismount the cowling in order to access the interior of the fuselage where the mechanisms are located. This procedure is time-consuming, and the fixations are expensive to maintain.

A different type of mechanism is that characterizing sliding cowlings. The cowling is mounted on rails that guide it along the fuselage from a closed to an open position. This requires, normally, at least two guiding rails arranged in a particular manner, which limits the particular surface geometry of the fuselage on which the arrangement can be mounted. The mechanism is, moreover, heavy and bulky.

Document U.S. Pat. No. 2,332,158 describes an enclosure arrangement for airplanes. More particularly, the arrangement is primarily used for military airplanes and has a pilot's cockpit in the front portion of the fuselage thereof and a gunner's cockpit behind the pilot's cockpit. The main parts of the enclosure arrangement include a dome shaped windshield in front of the pilot's cockpit, a fixed canopy between the two cockpits and a movable transparent hatch type closure member for the pilot's cockpit and the gunner's cockpit, respectively.

The document US 2007/0267539 A1 describes a hinged device for a door of an aircraft nacelle, whereby the door is able to block an opening that is made in the fairing of the nacelle. The device includes a base to which is connected a door, able to occupy a first retracted state in which the base is located in part inside the nacelle, and a second extended state in which the base is located outside the fairing of the nacelle so as to be able to move.

Aircraft are in need of lightweight cowling systems in order to minimize their overall weight, and therefore the power and fuel required for flight, and also in order to maximize the payload. Moreover, the design of the cowling should enable an easy and quick accessibility to the mechanism at the interior of the rotorcraft, while hindering the movements of the person carrying out the maintenance inspection as little as possible, e.g. by allowing a standing position for the inspection of the upper part of the fuselage where the rotor is placed.

BRIEF SUMMARY OF THE INVENTION

The rotorcraft of the present invention aims at remedying these problems by providing:
- a fuselage comprising an opening,
- a cowling suitable for closing such opening,
- a fastening system for attaching the cowling to the fuselage, the fastening system in turn comprising:
  - at least one supporting means pivotally attached to an interior of the fuselage, so that the at least one supporting means can rotate between a closing position and an opening position, the at least one supporting means comprising a projecting region located outside the fuselage when the at least one supporting means is at the opening position and located inside the fuselage when the at least one supporting means is at the closing position,
  - at least one translation means coupled to the projecting region and to the cowling so as to enable a translation of the cowling with respect to the projecting region, and arranged in such a way that the cowling is at a closed position closing the opening when the at least one supporting means is at the closing position,
  - wherein pivotal attachments between the interior of the fuselage (2) and the at least one supporting means (3) are located on a first reference axis (F) at the interior of the fuselage (2), and a second reference axis (S) is provided at the projecting region (3.1) along which the translation of the cowling (5) with respect to the projecting region (3.1) can take place; and wherein the first (F) and the second (S) reference axis extend along a longitudinal direction of the rotorcraft, such that the cowling (5) is able to reach a final position in which the cowling (5) extends perpendicularly to an elevation direction.

The cowling closes the opening of the fuselage when in a closed position. The cowling is connected to the at least one supporting means by means of at least one translation means to which the cowling and the at least one supporting means are coupled. When the cowling is at such closed position, the at least one supporting means is at the closing position, in which the projecting region is inside the fuselage. The at least one translation means, coupled to the projecting region, is thus inside the fuselage too.

The at least one supporting means is pivotally attached to the interior of the fuselage. When a rotation around these pivotal attachments takes place, the projecting region of the at least one supporting means reaches a point outside of the fuselage—in consequence, the at least one translation means, coupled to the projecting region, is also positioned outside the fuselage. This way, the cowling, which is normally flush with the fuselage when in the closed position, clears from the fuselage and from the opening.

The at least one translation means may be formed by any means capable of allowing at least a relative translation between the cowling and the projecting region of the at least one supporting means. Hence, the at least one translation means may at least comprise a movable element capable of translating with respect to the projecting region and to which the cowling is attached. This way, the translation of this movable element enables the translation of the cowling with respect to the projecting region.

When the at least one translation means is outside the fuselage, the translation movement permits removing the cowling from a particular position wherein it would impede the adequate inspection of the rotorcraft.

Besides, the cowling rotates with respect to the fuselage as a result from the above explained rotation of the at least one supporting means. This relative rotation can be adapted to the type of inspection of the interior of the fuselage to be performed. For a less detailed inspection, the rotation needs not be substantial; for a more detailed inspection, a further rotation may take place, so that the inside mechanisms can be more easily checked.

This combination of translational and rotational movements facilitates that, at the same time, the rotor and the mechanisms can be inspected.

In an embodiment, the pivotal attachments between the interior of the fuselage and the at least one supporting means are located on a first reference axis at the interior of the fuselage, and the translation of the cowling with respect to the projecting region takes place along a second reference axis of the projecting region.

In a particular embodiment, the first and second reference axes are parallel to the longitudinal direction of the rotorcraft, and the at least one supporting means is pivotally attached to the interior of the upper part of the fuselage.

The longitudinal direction of the rotorcraft is the direction along which the fuselage extends from the nose to the tailboom; the elevation direction is perpendicular to the longitudinal direction and parallel to the axis of rotation of the rotor.

When the rotation of the cowling with respect to the fuselage takes place, the cowling approaches a position, in this embodiment, in which it is placed perpendicularly to the elevation direction of the rotorcraft at the upper part of the fuselage.

Therefore, a person could in principle inspect the mechanism of the interior, but he would not be able to inspect the rotor—the cowling above him would keep him from standing up to the height of the rotor. The translational movement clears this upper area, allowing for a joint inspection of the rotor and the inside mechanisms.

Moreover, the fastening system is beneficial for the aerodynamics of the rotorcraft—when the cowling is closed, the fastening system remains hidden at the interior of the fuselage, thus causing no hindrance. The system is only unfolded when on ground during maintenance works.

The system is additionally advantageous in that it is formed by light, simple components. This is a consequence of the fact that the way of functioning of the arrangement does not exert excessive loads on the components of the arrangement, and that the moments generated by, for instance, the weight of the components are small, since the lever arms are configured for being small as well.

In an embodiment, the rotation of the cowling is exclusively the result of the rotation of the at least one supporting means about its pivotal attachments to the interior of the fuselage. The fastening system of this embodiment is configured to impede an additional rotation of the cowling with regard to the at least one translation means, and the only relative movement between the cowling and the at least one translation means is of translational nature. In this embodiment, the at least one translation means can be fixedly attached to the projecting region of the at least one supporting means, in which case this translational movement would imply a translation of the cowling with respect to the projecting region.

In an example of this embodiment, the at least one translation means comprises:
 a guiding rail which is fixed to the projecting region and which extends along the second reference axis,
 a slider suitable for sliding along the guiding rail,
 a holding means suitable for integrally attaching the slider and the cowling, the holding means comprising:
   a longitudinal bar substantially parallel to the guiding rail,
   a pin integrally joining the slider, the longitudinal bar and the cowling,
 wherein the fastening system further comprises a roller integrally attached to the at least one supporting means and abutting the longitudinal bar for impeding the rotation of the cowling with respect to the projecting region.

The at least one supporting means may comprise a plurality of curved rods having one end pivotally attached to the interior of the fuselage. The opposite end of the curved rods, forming part of the projecting region in this embodiment, may comprise, for example, a through hole inside which the guiding rail of the at least one translation means is fixedly attached.

The at least one translation means of this embodiment does also comprise a slider suitable for sliding along with respect to the guiding rail, the slider thus constituting the movable part referred to above. Since the guiding rail is fixed to the projecting region of the at least one supporting means, the slider can translate with respect to the guiding rail and the cowling is integrally secured to the slider, the cowling can translate with respect to the projecting region.

In order to ensure that there is no relative rotation of the cowling relative to the guiding rail (and thus, relative to the projecting region), the fastening system comprises a roller integrally attached to the at least one supporting means and abutting the longitudinal bar in such a way that the roller cannot rotate relative to the longitudinal bar. As the roller is fixed to the at least one supporting means, the longitudinal bar is fixed to the cowling by the pin and the at least one supporting means is, as explained above, fixed to the projecting region, the abutment keeps the cowling from rotating with respect to guiding rail and the projecting region. In further particular examples, the longitudinal bar is L-shaped or U-shaped so as to fittingly house the roller.

In an alternative embodiment, the cowling can rotate with respect to the projecting region; therefore, the overall rotation of the cowling with regard to the fuselage is the sum of the rotation of the cowling with respect to the projecting region plus the rotation of the at least one supporting means about its pivotal attachment.

In an example of this configuration, the pivotal attachments between the interior of the fuselage and the at least one supporting means are located on a first reference axis at the interior of the fuselage, and the translation and the rotation of the cowling with respect to the projecting region takes place along and around a second reference axis of the projecting region. In a particular case of this example, the translation means further comprises:
 a guiding rail which is fixed to the projecting region and which extends along the second reference axis,
 a slider suitable for sliding along and rotating around the guiding rail,
 a holding means, such as a pin, suitable for integrally attaching the slider and the cowling.

As in the above alternative, the at least one supporting means may comprise a plurality of curved rods having one end pivotally attached to the interior of the fuselage. The opposite end of the curved rods, forming part of the projecting region in this embodiment, may also comprise, for example, a through hole inside which the guiding rail of the at least one translation means is fixedly attached.

The slider of this particular case is suitable for sliding along and rotating around the guiding rail—since the guiding rail is fixed to the projecting region of the at least one supporting means, the slider can translate and rotate with respect to the guiding rail and the cowling is integrally secured to the slider, the cowling can translate and rotate with respect to the projecting region. In particular, such rotation may take place because there is no elements like the roller and the longitudinal bar of the above example engaging to keep the longitudinal bar, the pin, the slider and the cowling from rotating relative to the guiding rail and the and the projecting region.

In an embodiment, compatible with any previous example, the slider comprises a through hole through which the guiding rail passes so as to allow the translation of the slider with respect to the guiding rail.

In an example, there are two sliders, two pins joining at least the sliders and the cowling and three curved-shaped supporting means uniformly distributed and fixedly attached, by their projecting regions, to the guiding rail—two at the ends and one in the middle of the guiding rail. Each of the sliders is located at a different stage between supporting means and can therefore permit a distance of translation equivalent to the longitudinal gap between two consecutive supporting means—in an example, this distance is 700 mm, sufficient to achieve the commented advantage of allowing a person to stand in order to inspect the rotor.

Besides, the slider may comprise a bearing, a washer and a retaining ringer to facilitate the coupling with and the movements of translation and, in some embodiments, of rotation relative to the guiding rail.

The attachment system may further comprise a guiding rod pivotally attached to the fuselage and to the cowling. This guiding rod is suitable for providing guidance of the door such that the door can follow a predetermined path, by linking the translational and—in some cases—the rotational movements of the cowling with respect to the projecting region. The pivotal attachment between the guiding rod and the fuselage and the cowling may comprise spherical bearings to allow for relative rotations.

In an embodiment, the cowling is delimited by a periphery, and the guiding rod is pivotally attached to the cowling at a distance from the periphery of at least 10 cm. This distance relative to the edges of the cowling is adequate for a correct guidance of the cowling.

The second reference axis may extend along the longitudinal direction of the rotorcraft, so that the cowling is able to reach a final position in which it extends perpendicularly to the elevation direction, by means of the translation—and the rotation, if this is the case—of the cowling along—and around—the second reference axis of the projecting region and the rotation of the at least one supporting means about its pivotal attachments; and that, when the cowling is at such final position, the point of attachment between the guiding rod and the cowling is farther from a landing gear than the point of attachment between the guiding rod and the fuselage, so that the guiding rod holds the cowling at the final position.

In this example, when the cowling is at the final position the support of the guiding rod compensates the gravity force, and therefore the cowling can be stably held at such final position. As has been explained, the translational movement occurs, in this example, along the longitudinal direction, which leaves the space above a person inspecting the interior of the fuselage free of obstacles—he can stand on the opening and inspect the rotor.

The system may further comprise a retention means suitable for holding the cowling, together with the guiding rod, at an intermediate position between the closed position and the final position. Such retention means makes that, when a person pulls the cowling towards the exterior of the fuselage, he finds a resistance up to a predetermined relative rotation between the at least one supporting means and the fuselage. For example, the resistance may be designed to appear until a relative rotation of 20°. The support of the guiding rod and the resistance of the retention means compensate the gravity force, so the cowling can be stably maintained at this intermediate position.

The resistance of the retention means is overcome if a further pulling force is exerted on the cowling. Then, the relative movements between the projecting region of the at least one supporting means and the cowling and between the at least one supporting means and the fuselage can continue until the cowling reaches the final position. In an embodiment, the retention means are a kinematic or hydraulic actuator which can be integrated into the guiding rod; the actuator is designed to contribute to the opening of the cowling up to the final position once the predetermined relative rotation between the cowling and the projection region has been reached. This type of actuators can be similar, for example, to that used in some car trunks.

The rotorcraft may also comprise locking means for locking the cowling at the closed position. Conventional rotorcraft door locks or latches can be used as locking means.

The present invention does also cover a method for opening a cowling of a rotorcraft as described above, the method comprising the steps of:

rotating the at least one supporting means from a closing position to an opening position, translating the cowling with respect to the projecting region, so that the cowling moves from a closed position closing the opening of the fuselage to an open position.

As explained above, when the cowling is at the closed position the projecting region—and therefore the at least one translation means—is inside the fuselage. The at least one supporting means is at a position referred to as closing position.

Once the cowling is opened, e.g. by unlocking the locking means, the at least one supporting means is able to rotate around the pivotal attachments to the interior of the fuselage; after a certain rotation, the projecting region arrives at a position outside the aircraft, and so does the at least one translation means, coupled to the projecting region.

When, thanks to the outside position of the projecting region, the at least one translation means is outside the fuselage, the translation of the cowling with respect to the projecting region can advantageously take place, together with the rotation of the projecting region about the pivotal attachments, to clear the opening of the structure.

In an embodiment, the method additionally comprises the step of the rotation of the cowling with respect to the projecting region, as explained in some of the above examples.

The step of translating—and in some embodiments rotating—the cowling with respect to the projecting region of the at least one supporting means and of rotating the at least one supporting means around the pivotal attachments may be performed until the cowling reaches an intermediate open position. Such position, which in an embodiment can be characterized by a rotation of 20° of the at least one supporting means around the pivotal attachment, is suitable for a quick inspection of the mechanism.

These steps can continue until the cowling reaches a final open position wherein it extends perpendicularly to the elevation direction.

In the embodiment comprising the first and second reference axes, wherein the axes of rotations are parallel to the longitudinal direction of the rotorcraft, and the at least one supporting means is attached to the fuselage farther in elevation from the landing gear than the opening—that is, to the upper part of the fuselage—, the translational—and, in some examples, rotational—movements between the cowling and the at least one supporting means and the rotation of the at least one supporting means can lead to such final position. The translational movement leaves the upper part of the fuselage free of obstacles, which facilitates the inspection of the rotor.

The guiding rod can be used to hold the cowling at the final or intermediate positions, as explained above.

BRIEF DESCRIPTION OF THE SEVERAL VIEWS OF THE DRAWINGS

These and other features and advantages of the invention will become more evident from the following detailed description of preferred embodiments, given only by way of illustrative and non-limiting example, in reference to the attached figures:

FIG. 1 is a perspective view of a rotorcraft comprising a cowling to protect the mechanism of the rotor.

FIG. 2 shows two cowlings at a closed position.

FIG. 3 shows a fastening system between the cowling and the fuselage, the cowling being at an open position with respect to the opening of the fuselage.

FIG. 4 represents a person inspecting the rotor while standing on the opening.

FIG. 5 depicts a person squatting on the opening in order to inspect the mechanism at the interior of the fuselage.

FIG. 6 is a detailed view of a slider, comprising a through hole, suitable for at least sliding with respect to a guiding rail.

FIG. 7 depicts a spherical bearing allowing the relative movement between the cowling and the guiding rod.

FIG. 8 shows the cowling being held by the guiding rod at an intermediate position.

FIG. 9 shows a perspective view of the inside part of the fastening system, when the cowling is in a closing position.

FIG. 10 depicts a front view of the inside of the fastening system in such closing position.

DETAILED DESCRIPTION OF THE INVENTION

FIG. 1 shows a rotorcraft 1 having a cowling 5 at the upper part of a fuselage 2. The figure represents the cowling 5 at a closed position in which it closes an opening 8 of the fuselage 2 that enables the inspection of the inside mechanisms.

FIG. 2 shows two cowlings 5 at a closed position, closing the openings 8. The inside part of the fastening system attaching the fuselage 2 and the cowling 5 located farther from the observer, in the reference of the figure, can be partially seen—a curved-shaped supporting means 3 is pivotally attached to the interior of the fuselage 2 and fixedly attached, by a projecting region 3.1, to a guiding rail 4.1 of a translation means 4.

In the closed position, the translation means 4 is placed inside the fuselage 2, whose opening 8 is closed by the cowling 5. A guiding rod 6 is pivotally attached to the fuselage 2 by means of a spherical bearing 6.1.

The cowlings 5 of FIG. 2 are locked at the closed position by means a locking means 11.

In the position represented in FIG. 3, each of the three supporting means 3 have rotated around a first reference axis F located at the inside of the fuselage 2. Due to this rotation, the projecting region 3.1 of the supporting means 3 is at the outside of the fuselage 2, leading the translation means 4 to such outside position as well. The translation means 4 of the example of this figure also comprises two sliders 4.2, having a through hole through which the guiding rail 4.1 passes. Each one of the sliders 4.2 is located at a different one of the two stages between supporting means 3 defined along the guiding rail 4.1 by the three supporting means 3 of the embodiment.

The slider 4.2 is represented in more detailed in FIG. 6. The through hole is delimited by a cylindrical bearing 15, kept at the desired longitudinal position by a retaining ringer 16 and a washer 17.

The through holes of the sliders 4.2 allow for their translation along a second reference axis S of the projecting region 3.1, defined in this embodiment by the axis of the guiding rail 4.1.

The sliders 4.2 are integrally attached to the cowling 5 by means of a holding means 4.3, 4.4 comprising, in this embodiment, a longitudinal bar 4.3, parallel to the guiding rail 4.1 and two pins 4.4 joining the sliders 4.2 with both the longitudinal bar 4.3 and the cowling 5. Hence, the translation of the slider 4.2 implies a corresponding translation of the cowling 5. The longitudinal bar 4.3 is further linked to the cowling 5 with a lateral attachment 4.5 so as to increase the stability of the overall system.

Since the guiding rail 4.1 is fixed to the projecting region 3.1 of the supporting means 3, the sliders 4.2 translates relative to the guiding rail 4.1, and the cowling 5 is integrally attached to the sliders 4.2, the cowling 5 translates with respect to the projecting region 3.1. In the present embodiment, the movement of translation of the cowling 5 with respect to the supporting means 3 is therefore given by the translational movement of the sliders 4.2, in turn limited by the distance D between consecutive supporting means 3. In an embodiment, the distance D is 700 mm.

In the embodiment of FIG. 3, the rotation of the cowling 5 relative to the projecting region 3.1 is impeded by a roller 18, which is attached to two of the supporting means 3 and is configured to abut the longitudinal bar 4.3. The longitudinal bar 4.3 is integral with the cowling 5 and the slider 4.2, these elements being linked by the pin 4.4. Therefore, the cowling 5 cannot rotate relative to the projecting region 3.1 of the supporting means 3.

This arrangement is represented in detail in FIGS. 9 and 10. In such figures, two of the three supporting means 3 have rollers 18 attached to them. The rollers 18 are U-shaped to fit in the U-shaped profile of the longitudinal bar 4.3, giving rise to the explained rotational abutment. On the other hand, the inversely U-shaped profiles allow for a relative translation of the longitudinal bar 4.3—and therefore of the cowling 5—relative to the rollers 18—and thus, relative to the projecting region 3.1—.

By means of the rotation of the supporting means 3, the opening 8 to the interior of the fuselage 2 is cleared and a mechanism inside the fuselage can be inspected.

The first F second S reference axes are, in the embodiment of the figures from 1 to 4, parallel to the longitudinal direction of the rotorcraft 1. Accordingly, the rotation of the supporting means 3 around the pivotal attachments located in the first reference axis F, and the corresponding rotation of the cowling 5, may lead to a position of the cowling 5 perpendicular to the elevation direction of the rotorcraft 1. Such is the position represented in FIGS. 4 and 5.

In the embodiments of figures from 3 to 5, the translation leaves part of the outside region of the fuselage 2 above the opening 8 free of the obstacle of the cowling 5, so that a person squatting on the opening, while inspecting the inside mechanisms, can also stand and examine the rotor, as is depicted in FIGS. 4 and 5.

The sliders 4.2 of this embodiment are arranged to abut two consecutive supporting means 3 when the supporting means 3 are at the closing position and the cowling 5 closes the opening 8. This closing position corresponds to that depicted in FIGS. 9 and 10—the left-hand and central sliders 4.2, according to the reference of the figures, abut the left-hand and central supporting means; the sliders 4.2 thus have a stroke equal to the distance D between supporting means, which can be 700 mm, when moving towards the right-hand side. Hence, the maximum clearance in the direction of translation is the distance D; the value of 700 mm is adequate for the explained advantage of permitting the inspection of the rotor.

In the embodiment of FIGS. 4 and 5, the cowling 5 is held at the final position in which in it is substantially perpendicular to the elevation direction by the guiding rod 6. The guiding rod 6 is pivotally attached to the fuselage 2 and to the cowling 5 by means of spherical bearings 6.1 and 6.2. FIG. 7 represents the spherical bearing 6.1 joining the guiding bar 6 with the cowling 5. The attachment to the fuselage 2 is located lower, in the reference of these figures, than the attachment to the cowling 5—therefore, the support of the guiding rod 6 can compensate the gravity force.

In an embodiment, the attaching system further comprises a retention means suitable for holding the cowling 5, together with the guiding rod 6, at an intermediate position between the closed position and the final position. Such position is represented in FIG. 8.

REFERENCES

1. Rotorcraft
2. Fuselage
3. Supporting means
3.1. Projecting region
4. Translation means
4.1. Guiding rail
4.2. Slider
4.3. Longitudinal bar
4.4. Pin
4.5. Lateral attachment
5. Cowling
6. Guiding rod
6.1, 6.2. Spherical bearings
8 Opening
9. Landing gear
11. Locking means
15. Cylindrical bearing
16. Retaining ringer
17. Washer
18. Roller
F. First reference axis
S. Second reference axis
D. Distance

What is claimed is:

1. A rotorcraft comprising:
   a fuselage having an opening,
   a cowling suitable for closing the opening,
   a fastening system for attaching the cowling to the fuselage, the fastening system comprising:
      at least one supporting means pivotally attached to an interior of the fuselage, so that the at least one supporting means can rotate between a closing position and an opening position, the at least one supporting means comprising a projecting region located outside the fuselage when the at least one supporting means is at the opening position and located inside the fuselage when the at least one supporting means is at the closing position,
      at least one translation means coupled to the projecting region and to the cowling to enable a translation of the cowling with respect to the projecting region outside of the fuselage when the at least one supporting means is at the opening position and so that rotation of the cowling with respect to the fuselage takes place with rotation of the at least one supporting means whereby the entire cowling is cleared from the fuselage and the opening when the at least one supporting means is at the opening position, and the at least one translation means arranged in such a way that the cowling is at a closed position closing the opening when the at least one supporting means is at the closing position,
   wherein pivotal attachments between the interior of the fuselage and the at least one supporting means are located on a first reference axis (F) at the interior of the fuselage, and a second reference axis (S) is provided at the projecting region along which the translation of the cowling with respect to the projecting region outside of the fuselage can take place; and
   wherein the first reference axis (F) and the second reference axis (S) extend along a longitudinal direction of the rotorcraft, such that when rotation of the cowling with respect to the fuselage and translation of the cowling with respect to the projection region outside the fuselage take place the cowling can reach a final position in which the entire cowling is cleared from the fuselage and the opening, is longitudinally translated away from the opening, and extends perpendicularly to an elevation direction.

2. The rotorcraft of claim 1, wherein the at least one translation means comprises:
   a guiding rail which is fixed to the projecting region and which extends along the second reference axis (S),
   a slider suitable for sliding along the guiding rail,
   a holding means suitable for integrally attaching the slider and the cowling, the holding means comprising:
      a longitudinal bar substantially parallel to the guiding rail,
      a pin integrally joining the slider, the longitudinal bar, and the cowling, and
   wherein the fastening system additionally comprises a roller integrally attached to the at least one supporting means and abutting the longitudinal bar for impeding the rotation of the cowling with respect to the projecting region.

3. The rotorcraft of claim 1, wherein the at least one translation means is coupled to the projecting region and to the cowling to enable a rotation of the cowling with respect to the projecting region.

4. The rotorcraft of claim 3, wherein the translation and the rotation of the cowling with respect to the projecting region can take place along and around the second reference axis (S).

5. The rotorcraft of claim 4, wherein the at least one translation means further comprises:
a guiding rail which is fixed to the projecting region and which extends along the second reference axis (S),
a slider suitable for sliding along and rotating around the guiding rail,
a holding means suitable for integrally attaching the slider and the cowling.

6. The rotorcraft of claim 1, further comprising a guiding rod pivotally attached to the fuselage and the cowling.

7. The rotorcraft of claim 6, wherein the guiding rod is pivotally attached to the fuselage and to the cowling by spherical bearings.

8. The rotorcraft of claim 6, wherein the cowling is delimited by a periphery, and the guiding rod is pivotally attached to the cowling at a distance from the periphery of at least 10 cm.

9. The rotorcraft of claim 6, wherein, when the cowling is at the final position, the point of attachment between the guiding rod and the cowling is farther from a landing gear than the point of attachment between the guiding rod and the fuselage, so that the guiding rod holds the cowling at the final position.

10. The rotorcraft of claim 9, wherein the fastening system further comprises a retention means suitable for holding the cowling, together with the guiding rod, at an intermediate position between the closed position and the final position.

11. A method for opening a cowling of the rotorcraft according to claim 1, comprising the steps of:
rotating the at least one supporting means from a closing position to an opening position,
translating the cowling with respect to the projecting region,
so that the cowling moves from a closed position closing the opening of the fuselage to an opened position in which the cowling is cleared from the opening.

12. The method of claim 11, further comprising the step of rotating the cowling with respect to the projecting region.

13. The method of claim 11, wherein the cowling reaches a final position in which the cowling extends perpendicularly to the elevation direction and an intermediate position between the closing position and the final position.

14. The method of claim 13, further comprising the step of holding the cowling at the intermediate and/or at the final position by a guiding rod.

15. The rotorcraft of claim 1, wherein the at least one translation means comprises:
a guiding rail which is fixed to the projecting region and which extends along the second reference axis (S),
a slider suitable for sliding along the guiding rail, and
a holding means suitable for integrally attaching the slider and the cowling whereby translation of the cowling with respect to the projecting region takes place along the guiding rail.

16. The rotorcraft of claim 1, wherein the at least one translation means comprises
a guiding rail which is fixed to the projecting region and which extends along the second reference axis (S),
a first slider and a second slider both suitable for sliding along and rotating around the guiding rail, and
a first holding means suitable for integrally attaching the first slider and the cowling and a second holding means suitable for integrally attaching the first slider and the cowling whereby translation of the cowling with respect to the projecting region takes place along the guiding rail.

17. The rotorcraft of claim 1, wherein:
the at least one supporting means includes a first supporting means having a first projection region and a second supporting means having a second projection region; and
the at least one translation means includes a guiding rail which is fixed to the first projecting region and the second projection region and which extends along the second reference axis (S), a first slider and a second slider both suitable for sliding along and rotating around the guiding rail, and a first holding means suitable for integrally attaching the first slider and the cowling and a second holding means suitable for integrally attaching the first slider and the cowling whereby translation of the cowling with respect to the first projection region and the second projection region takes place along the guiding rail.

18. The rotorcraft of claim 17, wherein the first slider is located along the guiding rail between the first projection region and the second projection region such that translation of the cowling with respect to the first projection region and the second projection region takes place along the guiding rail is confined to a distance between the first projection region and the second projection region.

\* \* \* \* \*